(12) United States Patent
Swanson et al.

(10) Patent No.: US 8,219,851 B2
(45) Date of Patent: Jul. 10, 2012

(54) SYSTEM RAS PROTECTION FOR UMA STYLE MEMORY

(75) Inventors: Robert C. Swanson, Olympia, WA (US); Mallik Bulusu, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 12/649,296

(22) Filed: Dec. 29, 2009

(65) Prior Publication Data

US 2011/0161726 A1 Jun. 30, 2011

(51) Int. Cl.
G06F 11/00 (2006.01)
G06F 11/20 (2006.01)

(52) U.S. Cl. .................... 714/6.32; 714/6.3; 714/6.1

(58) Field of Classification Search .................... 714/6.1, 714/6.32, 6.3

See application file for complete search history.

(56) References Cited

U.S. PATENT DOCUMENTS

| | | | |
|---|---|---|---|
| 5,243,570 A * | 9/1993 | Saruwatari | 365/63 |
| 6,219,286 B1 * | 4/2001 | Fuchigami et al. | 365/200 |
| 6,487,623 B1 * | 11/2002 | Emerson et al. | 710/302 |
| 6,535,992 B1 * | 3/2003 | Cheng | 714/5.11 |
| 6,634,003 B1 * | 10/2003 | Phan | 714/710 |
| 6,762,965 B2 * | 7/2004 | Benedix et al. | 365/201 |
| 7,222,062 B2 | 5/2007 | Goud et al. | |
| 7,287,138 B2 * | 10/2007 | Bland et al. | 711/162 |
| 7,415,644 B2 * | 8/2008 | Bower et al. | 714/724 |
| 2007/0214333 A1 * | 9/2007 | Nijhawan et al. | 711/165 |
| 2009/0119748 A1 | 5/2009 | Yao et al. | |

* cited by examiner

*Primary Examiner* — Joseph Schell
(74) *Attorney, Agent, or Firm* — Grossman, Tucker, Perreault & Pfleger, PLLC (57) ABSTRACT

In some embodiments, the invention involves a system and method relating to system recovery in a fault resilient manner by isolating errors associated with the management engine (ME) UMA memory. BIOS logs errors occurring on memory within the system. The ME UMA is invisible to the host OS, so the OS will not be notified about the errors occurring in the ME UMA range. When an error threshold has been reached for a memory unit in which ME UMA resides, ME UMA data is migrated to a previously reserved backup region of memory and the ME is notified of the new ME UMA location. The faulty memory is flagged for replacement at a next maintenance cycle. Embodiments may be applied to workstations that utilize ECC memory protection which utilize AMT (Active Management Technology) and ME UMA. Other embodiments are described and claimed.

21 Claims, 5 Drawing Sheets

SYSTEM RAS PROTECTION FOR UMA STYLE MEMORY

FIELD OF THE INVENTION

An embodiment of the present invention relates generally to reliability, availability and serviceability (RAS) of computing platforms and, more specifically, to isolating errors associated with the ME UMA memory in workstations that utilize ECC memory protection which utilize AMT (Active Management Technology) and ME UMA.

BACKGROUND INFORMATION

Some existing computing platforms have begun to be deployed with both a host processor and an embedded microcontroller, often having out-of-band communication capability. This embedded microcontroller typically operates independently of the host processor, and may have its own connection to the power supply and network interface devices. Some systems utilize an active management technology such as available from Intel Corporation (see for instance, Intel® AMT at URL www*intel*com/technology/platform-technology/intel-amt/ where periods are replaced with asterisks in this document to avoid inadvertent hyperlinks). Some AMT deployments utilize what is known as a management engine (ME). A user guide for the ME implemented for Intel® vPro™ deployments may be found at communities*intel*com/docs/DOC-1550.

While the documents cited above are directed toward specific implementations of an ME environment, it should be understood that ME is used herein to refer to a generic implementation not tied to a specific platform or architecture. A management engine or service processor is an isolated and protected computing resource. It provides information technology management features independent of any installed operating system, including allowing improved management of corporate assets and a standardized corporate assets management technology. It includes firmware that provides management features for clients. It also allows system administrators to remotely manage a platform that has the management engine on it.

The ME microcontroller may have its own ROM and cache memory. However, memory directly coupled to the ME may be SRAM (static RAM), which is slower than the host DRAM, and also limited in size. The ME may also use firmware in a protected area of system flash memory which is sequestered from the host operating system (OS).

The ME or Management Engine is now being utilized on server systems to support technologies surrounding power management; system availability; reliability, availability and serviceability (RAS); error logging; core clock initialization; etc. Without a functional ME the system will typically not boot or operate correctly. Because the ME is being adopted as a "basic needs" component for some platforms for "efficient performance" and "mission critical" needs, for instance, the Intel® Xeon® processor, the ME presents a potential stability issue for some server platforms. To accomplish the ME feature set on client systems, the embedded microprocessor may use a portion of host DRAM memory which is carved out of by BIOS during the POST (Power On Self Test) process. This memory sharing architecture is called UMA (Unified Memory Architecture). A problem exists in that the ME UMA memory represents a single point of failure that is not acceptable on high availability servers. If an uncorrectable error occurs within the UMA range, these existing systems will fail.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to system recovery in a fault resilient manner by isolating errors associated with the ME UMA memory. Embodiments do not require that any memory RAS be enabled (mirroring/sparing) aside from ECC (Error Correction Code) protection. BIOS is notified upon each error occurring in memory. However, the ME UMA is invisible to the host OS. Thus, the OS will not be notified about the errors occurring in the ME UMA range. Embodiments may be applied to workstations that utilize ECC memory protection which utilize AMT (Active Management Technology) and ME UMA.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In an embodiment of the invention, the BIOS allocates ME UMA memory and may be migrated in a fault tolerant manner. This migration may be initiated upon a potential predictive failure of the memory associated with the ME UMA allocated memory.

Figure 1:
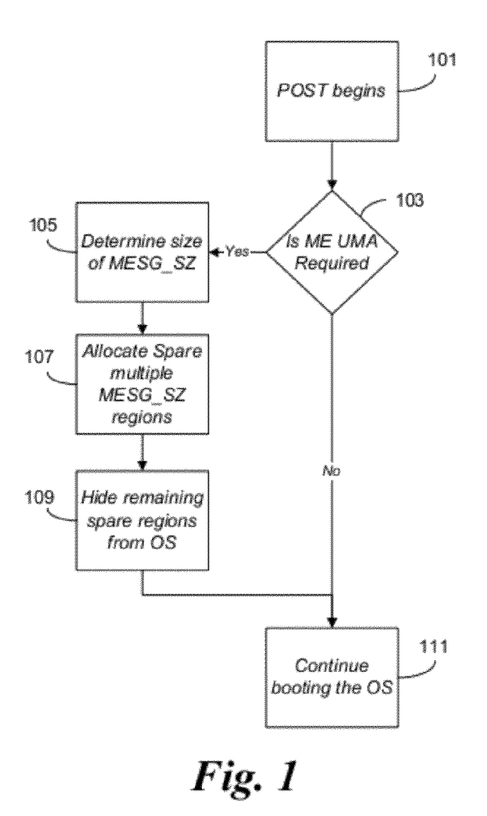
FIG. 1 is a flow diagram illustrating a method during POST to enable for migrating ME memory to prevent uncorrectable errors in ME UMA memory, according to an embodiment of the invention.

FIG. 1 is a flow diagram illustrating the method for migrating ME memory to prevent uncorrectable errors in ME UMA memory, according to an embodiment of the invention. During POST at 101, a determination is made as to whether ME UMA is required, in block 103. If not, then booting of the operating system (OS) continues at block 111. Otherwise, the BIOS will check the ME UMA size request MESG_SZ (ME segment size) to determine how much UMA is needed, in block 105. The BIOS then proceeds to the memory reference code to initialize the host DRAM. During the initialization, the BIOS allocates MESG_SZ regions of spare memory from host memory, in block 107. Without loss of generality, the BIOS may make N allocations as long as N is less than the size of DRAM. The BIOS may, preferably, select different physical sockets and/or DIMMs for each of the N allocations. It should be noted that in existing systems, only one permanent ME UMA region may be allocated.

The BIOS then chooses one of the MESG_SZ allocations and will setup the SAD (system address decoders) for MESEG (ME segment) base/limit. In an embodiment, the selection of the active region may be based on a random element. The SAD identify for the chipset the range of ME UMA memory to enable the chipset to enforce proper memory usage, e.g., block the host OS from accessing the ME UMA. It should be noted that the SAD registers may only be modified within a BIOS SMI function. The OS is not permitted to modify or access the SAD. Once the SAD registers are modified, their access is cut off from usual BIOS operations. The remaining spare regions of allocated memory are also hidden from the OS, in block 109. In other words, one allocated spare region is made active ME UMA and N-1 allocated spare regions are reserved for the ME and made invisible to the OS, for later use. The BIOS keeps track of the allocated regions, typically in a log in NVRAM. The BIOS then proceeds with POST, in block 111.

It should be noted, that each time a platform is booted, the same region(s) of memory are allocated the ME UMA, absent removal of the memory from use, because the same algorithm is used by BIOS to allocate the memory at each reboot/reset. Thus, uncorrectable errors in this region of memory can cause catastrophic failure of the platform. Thus, it is important to deactivate the faulty memory before these failures are seen in ME processing. When the memory is deactivated, the BIOS will automatically utilize another memory region on a reboot.

Figure 2:
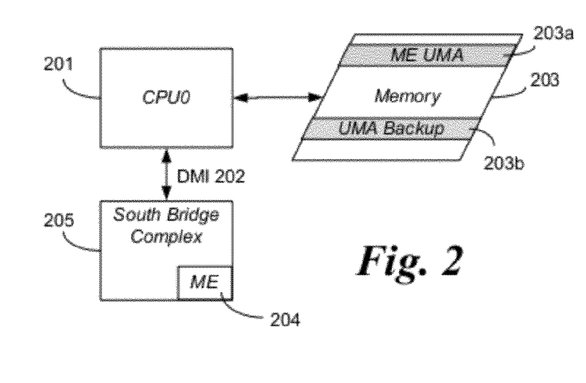
FIG. 2 illustrates a one socket platform having a single socket processor complex, according to an embodiment of the invention.
Figure 3:
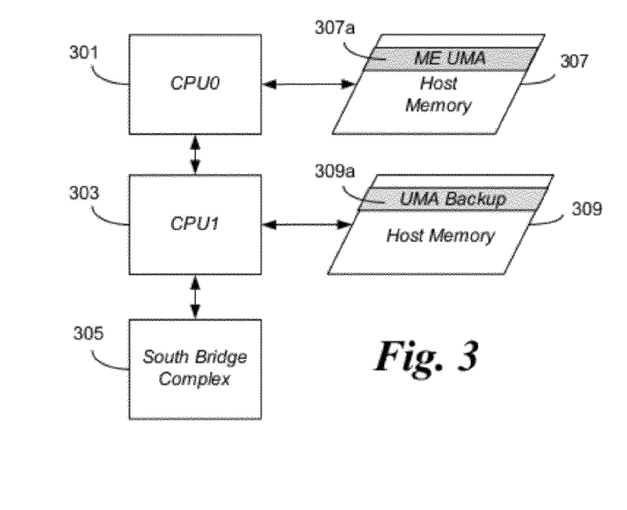
FIG. 3 illustrates a two socket platform having two processors, according to an embodiment of the invention.

FIGS. 2 and 3 are block diagrams representing two alternative memory layouts for a one and two socket system, according to embodiments of the invention. It will be understood that FIGS. 1 and 2 are merely exemplary illustrations and that embodiments of the present invention may be implemented with more than two sockets.

FIG. 2 illustrates a one socket embodiment having a single socket processor complex 201. Processor 201 is coupled to a south bridge, or input/output controller, complex 205, typically via a proprietary bus, for instance for Intel Corp. processors, a DMI bus 202. The ME 204 may be located within the south bridge complex 205. The Processor 201 is coupled to memory 203. In general, there will be one or more DIMMs (dual in-line memory modules) for each socket. It will be understood that memory is not limited to being of type DIMM and that other memory types may be used.

Memory 203 includes a reserved region 203a for the ME UMA, and the additional spare allocated regions for UMA backup 203b. It may be preferred that the UMA memory backup 203b should reside on a different physical DIMM than the primary ME UMA 203a memory region. In this embodiment, the memory controller (not shown) resides within the processor 201. The ME 204 communicates with the ME UMA memory via the processor 201, but only messages originating from the ME will be able to access the reserved portions 203a-b.

In the case where there are multiple sockets, the ME UMA and UMA backup may reside on any active socket. When a socket is to be removed for impending maintenance or current failure, the ME UMA and backup UMA may be moved to a different active socket memory, as discussed further below.

FIG. 3 illustrates a two socket embodiment having two processors 301 and 303. In this exemplary embodiment, processor 303 is coupled to a south bridge, or input/output controller, complex 305. Processor 301 is coupled to memory 307, and processor 303 is coupled to memory 309. Memory 307 and 309 are separate physical DIMMs. In general, there may be one or more DIMMs (dual in-line memory modules) for each socket. Memory 307 includes a reserved region 307a for the ME UMA, and memory 309 includes one or more additional spare allocated regions for UMA backup 309a.

At runtime the BIOS has the responsibility of logging errors that occur in the memory subsystem(s). According to an embodiment of the invention, the BIOS utilizes predictive failure analysis to ascertain if the error occurred within the range of the UMA ME memory. Once the number of correctable errors associated with the ME UMA memory reaches a predefined threshold the BIOS migrates the UMA memory from the initially allocated pool to a region in the UMA backup location. Because the ME is a secure block of code, this migration should be done completely while in SMM (system management mode) and the ME and other agents in the system capable of driving memory traffic should be quiesced/halted. If the SMM code is written by a third party, the BIOS can effect this migration by programming a hardware copy-engine to migrate the contents such that only the chipset can see this memory, versus BIOS seeing the contents of MESEG. In another alternative SMI Transfer Monitor (STM) may be utilized to perform the copy.

Figure 4:
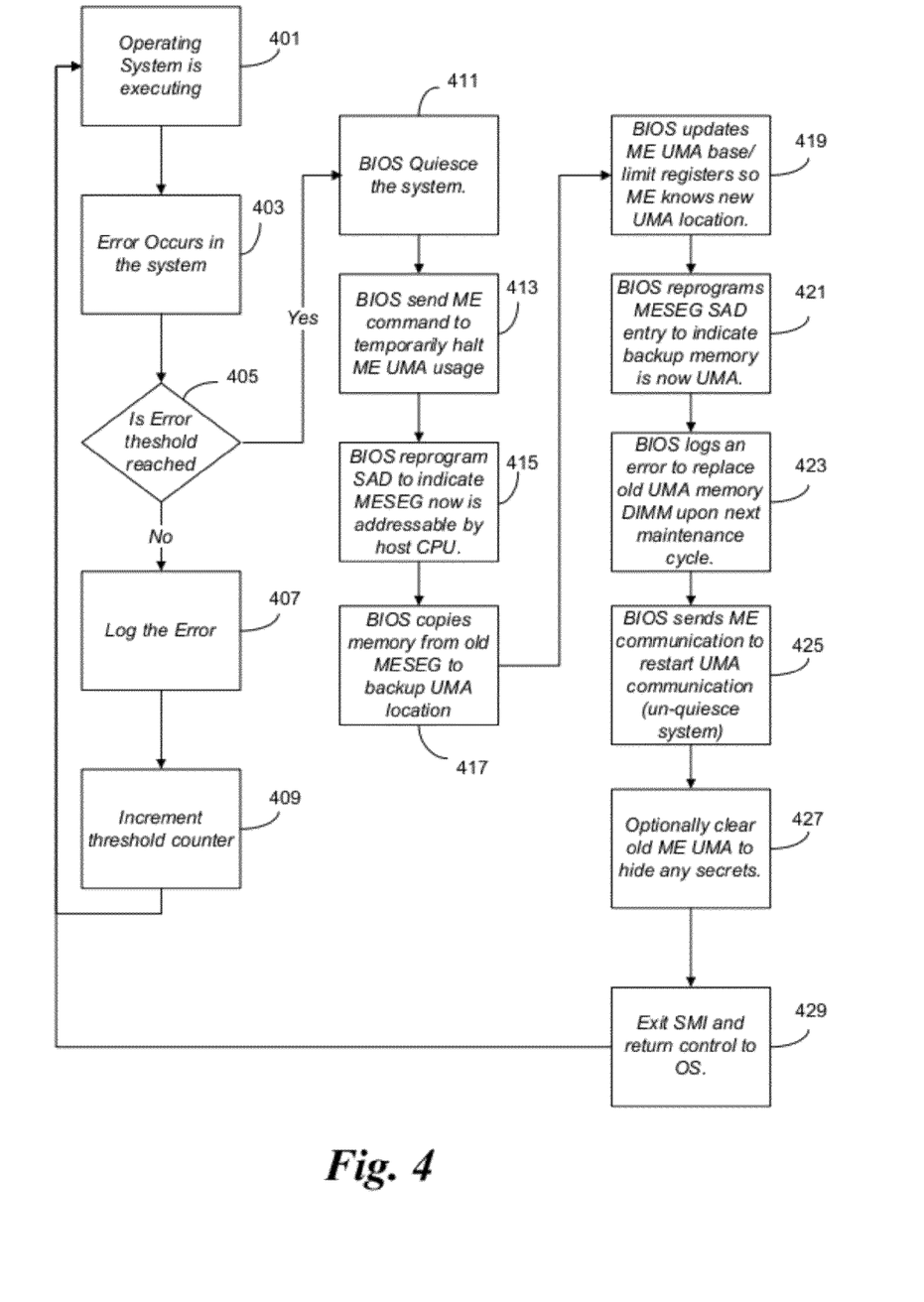
FIG. 4 is a flow diagram illustrating a method for migrating to a backup ME UMA memory region during runtime, according to an embodiment of the invention.

FIG. 4 is a flow diagram illustrating a method for migrating to a backup ME UMA memory region during runtime, according to an embodiment of the invention. During runtime, the OS is executing normally, in block 401. When an error occurs in the system, it is identified in block 403. A determination is made as to whether the error threshold has been reached, in block 405. If not, the error is logged in block 407, and the error count is incremented in block 409. Control returns to normal OS operation, in block 401.

If the error threshold has been reached, as determined in block 405, the BIOS SMI (System Management Interrupt) is initiated and the BIOS will quiesce/halt the system inclusive of the ME to prevent any process from accessing the ME UMA memory, in block 411. The BIOS notifies the ME of the impending migration to re-evaluate its UMA base/limit registers. This operation will cause the ME to stop utilizing the UMA memory temporarily, in block 413.

The BIOS reprograms the SAD (System Address Decoder) registers to indicate MESEG memory is now addressable by the host processor, in block 415. The BIOS copies the ME UMA memory to the backup UMA in block 417. The BIOS then resets the ME UMA base/limit register, in block 419, so that the ME will be able to find the new UMA location. The BIOS reprograms MESEG SAD entry to indicate that ME UMA backup memory range is now MESEG, in block 421. The BIOS logs an error associated with the ME UMA memory DIMM, in block 423. This allows the system operators to replace the DIMM during the next servicing operation. Since the ME UMA memory is now located on a different DIMM, this replacement will not have a significant effect on the availability of this system.

The BIOS sends a message to ME to begin operation (i.e. un-quiesce), in block 425. Since there may be sensitive data in the old ME UMA memory, system policy may require that the former ME UMA memory is cleared, or overwritten before resuming normal operations, in block 427. The SMI handler is exited in block 429 and normal operations are resumed in block 401.

Because the memory associated with the ME UMA is not given back to the OS, the memory range will not be utilized by the host processor and any errors associated with that range will not be stressed. This will yield higher RAS allowing the system to continue operating.

Figure 5:
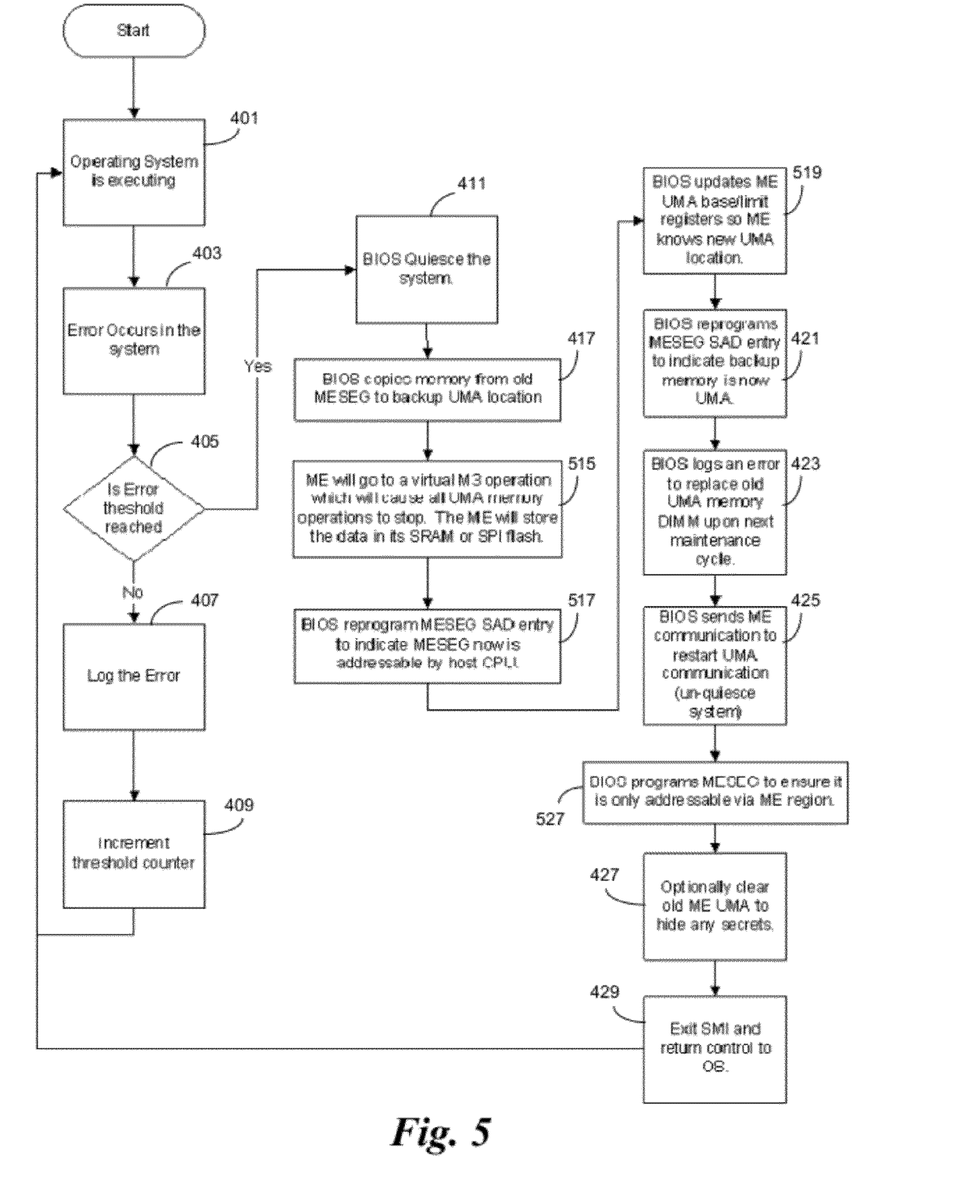
FIG. 5 is a flow diagram illustrating a method for migrating to a backup ME UMA memory region during runtime, according to another embodiment of the invention.

FIG. 5 is a flow diagram illustrating a method for migrating to a backup ME UMA memory region during runtime, according to another embodiment of the invention. In this exemplary embodiment, the BIOS forces the ME to use the local SRAM instead of DRAM for a temporary period and to vacate the ME UMA region. Once the active memory has been migrated to SRAM, the ME UMA ranges may be modified. This alternative memory enables the migration to occur without the SMM having knowledge or control of the migrated data, and may be preferred when the SMM is controlled by a third party/vendor.

The method as illustrated in FIG. 5 is similar to that shown in FIG. 4. After the BIOS has halted the system, in block 411, the BIOS will copy the memory from the old MESEG (ME segment), as before, to the backup UMA location, in block 417. However, in block 515, the method may differ. The BIOS sends a request to put the ME into a "fake" power state, typically via a HECI message, which will cause the ME UMA memory operations to cease. The ME will then store its data from the ME UMA into local SRAM or SPI flash, anticipating a power loss, or shutdown. This copy operation is automatic based on the requested power state change.

The BIOS then reprograms the MESEG SAD entry to indicate that the MESEC is now addressable by the host processor, in block 517. The BIOS updates the ME UMA base/limit registers so that the ME will be able to identify the new ME UMA location, in block 519. The BIOS reprograms the MESEG ASD entry to indicate that the backup memory is now UMA, as in FIG. 4, in block 421. The BIOS logs an error to replace the old UMA memory DIMM upon the next maintenance cycle, in block 423 and then sends the ME a communication to restart the UMA, in block 425. The operation of restarting from the altered power state will cause the ME to write the saved memory contents in the SRAM or flash back to the new ME UMA location, for faster access.

The BIOS programs the MESEG to ensure that it is the only addressable ME region, in block 527. Process continues as FIG. 4, in block 427, 429 and then to OS operation in 401.

In another alternative embodiment, a hardware copy engine within the memory controller may be used to copy the ME UMA to a backup region. This method also protects the ME UMA data from being seen by the SMM.

In existing systems, if a server system (or desktop) utilizes UMA memory and there was an error in the UMA region, the system would reset or machine check. If an uncorrectable error occurs in the ME UMA range, the system will fail. Additionally, as the capabilities of the ME continue to grow use of UMA and embodiments of the invention may avoid costly additions to bill of materials (BOM) for a platform.

Figure 6:
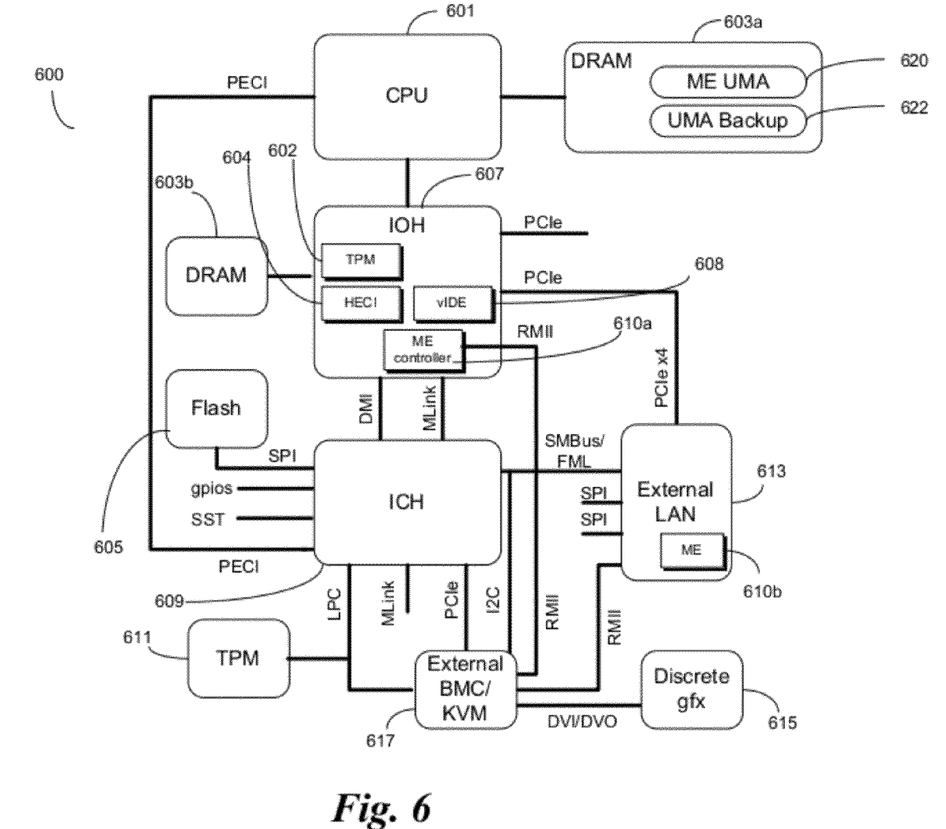
FIGS. 6 and 7 are block diagrams illustrating both exemplary server and client platforms, respectively, which may be utilized in implementation of various embodiments of the invention.
Figure 7:
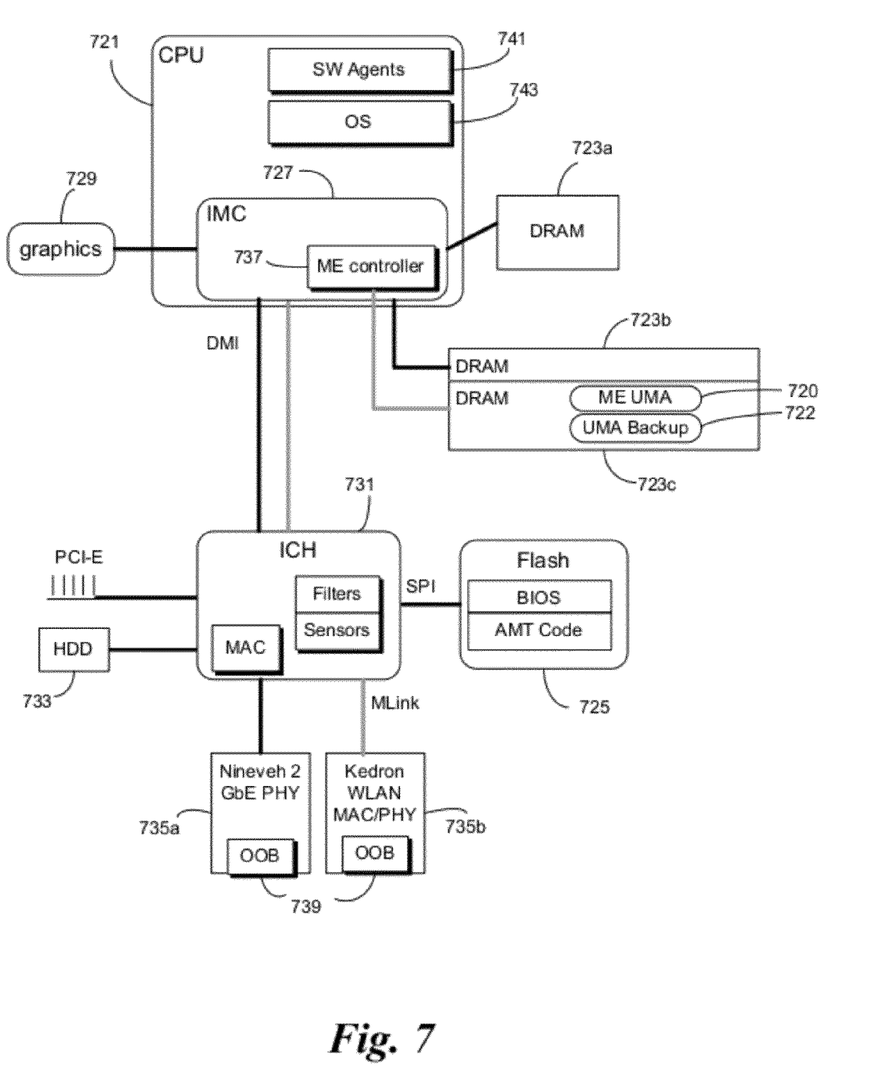

FIGS. 6 and 7 are block diagrams illustrating both exemplary server and client platforms which may be utilized in implementation of various embodiments of the invention. It will be understood that these figures are used for illustration only, and embodiments of the invention may be implemented on a variety of platform architectures.

Referring now to FIG. 6, there is shown a block diagram illustrating an exemplary server platform, according to embodiments of the invention. In one server embodiment, a platform comprises processor 601 communicatively coupled to DRAM 603a-b, an input/output Hub (IOH) 607, flash memory 605, and an input/output controller hub (ICH) 609. In this server embodiment, the north bridge (memory controller not shown) may reside in the processor 601.

DRAM 603a may have a reserved portion for use by the ME, as discussed above. The reserved portion may be logically partitioned into current ME UMA 620 and one or more UMA backup portions 622.

Processor 601 may be any type of processor capable of executing software, such as a microprocessor, digital signal processor, microcontroller, or the like. Though FIG. 6 shows only one such processor 601, there may be one or more processors in platform hardware 600 and one or more of the processors may include multiple threads, multiple cores, or the like.

The platform may have a trusted platform module (TPM) 611 and may be connected to an external LAN 613. The platform may also be coupled with a discrete graphics controller 615 via an external baseboard management controller (BMC) or keyboard-video-mouse (KVM) interface 617. KVM is a chip that allows multiplexing many possible local/remote keyboards/mice/video sources. In this exemplary embodiment, the IOH 607 may have additional components for TPM 602, host embedded controller interface (HECI) 604, virtual IDE (vIDE) 608, and micro-controller engine (ME) controller 610a. The HECI 604 is similar to a PCI device and is the means by which the basic input output system (BIOS) and operating system (OS) may communicate with the ME 610a. The micro-controller engine may also be known as a manageability engine, Intel® AMT or VPro™ device, for instance, available from Intel Corporation, for use with remote management of the platform. The ME 610a uses the reserved memory portion 620 of DRAM 603a during runtime. The vIDE 608 enables virtual indirection to a LAN 613. In an embodiment, the ME controller 610a may have a limited amount of ROM to store its code. In this case, the ME controller 610a may access a partitioned, or protected, portion of the flash 605, or other solid state memory, having ME or AMT code. Resources in the ICH 609 may be required for the ME controller 610a to perform other AMT functions. The external LAN 613 may also have a separate ME controller component 610b.

The ME controller 610a or 610b may program other chips on the platform via a number of buses and communication paths within the platform. The link between the processor 601 and the IOH 607 may comprise a point to point (pTp) interconnection link, quick path interconnect (QPI) or other communication interface. The integrated memory controller (IMC), previously a north bridge, is typically built into the processor 601 for servers, and is not shown.

In an alternative embodiment, the external BMC 617 may be used to resume from sleep mode, S3, using a protected storage instead of using the embedded ME 610. In this case, the BMC 617 would require an appropriate bus to be able to communicate to the platform chips to ensure appropriate configuration when running the stored boot script.

The AMT code may reside in a protected portion of flash memory 605. This portion is inaccessible to the OS and firmware (BIOS/EFI). In some embodiments, there may be a BAR register in the ICH 609. Upon boot, the BIOS sets the register in the ICH 609 to define which portions of the flash are accessible to the BIOS and which portion is accessible only to the ME 610. If the ICH BAR register indicates that a portion of the flash is inaccessible to the BIOS, the memory will be unmappable and completely invisible and inaccessible to the firmware and OS. Other methods of sequestering portions of the memory via a hardware protection scheme may be devised and used by those of skill in the art.

FIG. 7 illustrates an exemplary client platform, according to embodiments of the invention. In an exemplary client embodiment, the platform comprises a processor 721 having possible software agents 741 and an operating system 743. The processor 721 may be communicatively coupled to DRAM or solid state memory 723*a-c* via an integrated memory controller (IMC), previously a north bridge 727. In embodiments, the IMC 727 may be integrated within the processor 721. In embodiments implemented on older platforms, the IMC 727 may be a component separate from the processor 721 (not shown). The IMC 727 may communicate to a graphics interface 729 and an ICH 731. The ICH 731 may communicate with a hard disk drive (HDD) 733, flash memory 725 and one or more network interface devices 735*a-b*, for instance the Ninevah 2 Ethernet controller or the Kedron wireless LAN adapter, both available from Intel Corp. The network devices 735*a-b* may have an out-of-band (OOB) communications component 739. In this embodiment, the ME subsystem 737 may be built into the IMC 727. The flash memory 725 may comprise the firmware code (BIOS), protected AMT code and manufacturer settings. It will be apparent to one of skill in the art that processors 601 (FIG. 6) and 721 may comprise single or multi-processors and/or may have more than one core.

The embodiment shown in FIG. 7 may operate in a similar manner as that shown in FIG. 6. Both embodiments may utilize a manageability engine (ME) 610, 737 to store and retrieve boot scripts in a protected memory, for instance flash 605, 725. A resume from wake may process the boot script on the ME controller 610, 737, or send the appropriate commands and data to the processor 601, 721 for processing by system firmware. Other embodiments may utilize the host processor for controlling the re-image processes and be devoid of an ME embedded processor.

Embodiments of the present invention may find application to other platforms available from Intel Corporation assets that rely on similar OS-opaqueness. For instance, the sequestered memory MSEG for the SMI Transfer Monitor (STM), as disclosed in U.S. Pat. No. 7,222,062 B2 entitled "Method And System To Support A Trusted Set Of Operational Environments Using Emulated Trusted Hardware," and in implementations of methodology described in U.S. Pub. No. US 2009/0119748 entitled "System Management Mode Isolation In Firmware" describing the Intel® Enhanced Debug (IED) range of System management ram (RAM) for Intel® Periodic SMI (PSMI) handler and chipset patch. These are applications where having this sequestered DRAM memory RAS will be of value. Specifically, the OS or OEM (original equipment manufacturer) cannot participate in memory RAS for these regions since they are protected by hardware registers from OEM BIOS memory RAS handlers, etc.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system, comprising:
   a host processor having one or more sockets, each socket coupled with memory;
   a first region of the memory reserved for use by an on-board processing unit during runtime;
   n-1 additional reserved regions of memory, wherein the first region and the n-1 additional reserved regions of memory are invisible to and inaccessible by an operating system executing on the host processor;
   logic for error correction of the memory, wherein the logic for error correction maintains a count of correctable and uncorrectable errors within the memory; and
   migration logic configured to migrate data in the first region of memory to one of the n-1 additional regions of memory, the migration responsive to the count of correctable errors reaching a pre-determined threshold, and wherein the migration logic is further configured to notify the on-board processing unit of the one of the n-1 additional regions of memory to be used during runtime instead of the first region of memory, wherein the migration logic is further configured to initiate a change of power state of the on-board processing unit to cause the on-board processing unit to save the data in the first region of memory to local memory, and then initiate a second active power state of the on-board processing unit, after the notifying the on-board processing unit of the one of the n-1 additional regions of memory to be used during runtime.

2. The system as recited in claim 1, wherein at least one of the additional n-1 regions of memory is on a different physical memory unit than the first region.

3. The system as recited in claim 1, wherein the migration logic is further configured to deactivate a physical memory unit on which the first memory region resides.

4. The system as recited in claim 3, wherein the deactivated memory unit is to be flagged for replacement at a next maintenance cycle.

5. The system as recited in claim 1, wherein the migration logic further comprises system logic within a basic input/output system (BIOS) configured to copy the data in the first region of memory to the one of the n-1 additional regions of memory, after suspending other system operations of both the host processor and on-board processing unit.

6. A method, comprising:
   reserving a first region of a memory for use by an on-board processing unit on a platform;
   reserving n-1 additional regions of the memory, wherein the first region and the n-1 additional reserved regions of the memory are invisible to and inaccessible by an operating system executing on the host processor on the platform;
   responsive to a memory error identified during runtime, maintaining a count of correctable and uncorrectable errors within the memory; responsive to the count of correctable errors reaching a pre-determined threshold, migrating data in the first region of memory to one of the n-1 additional regions of memory;
   notifying the on-board processing unit to use the one of the n-1 additional regions of memory instead of the first region of memory;
   initiating a change of power state of the on-board processing unit to cause the on-board processing unit to save the data in the first region of memory to local memory; and
   initiating a second active power state of the on-board processing unit, after the notifying the on-board processing unit of the one of the n-1 additional regions of memory to be used during runtime.

7. The method as recited in claim 6, wherein at least one of the additional n-1 regions of memory is on a different physical memory unit than the first region.

8. The method as recited in claim 6, further comprising:
   deactivating a physical memory unit on which the first memory region resides.

9. The method as recited in claim 8, further comprising flagging the deactivated memory unit for replacement at a next maintenance cycle.

10. The method as recited in claim 6, further comprising:
    copying data in the first region of memory to the one of the n-1 additional regions of memory, after suspending other system operations of both the host processor and on-board processing unit.

11. The method as recited in claim 6, wherein the reserving of the first and n-1 regions of memory further comprise:
    setting system address decoder registers based on sizes of the reserved regions to enforce memory usage by a chipset associated with the platform, wherein the system address decoder registers are accessible only at a system management level and are not accessible to the operating system or firmware.

12. A non-transitory medium having instructions stored thereon, the instructions when executed by a machine, cause the machine to:
    reserve a first region of a memory for use by an on-board processing unit on a platform;
    reserve n-1 additional regions of the memory, wherein the first region and the n-1 additional regions of the memory are invisible to and inaccessible by an operating system executing on the host processor on the platform;
    responsive to a memory error identified during runtime, maintain a count of correctable and uncorrectable errors within the memory;
    responsive to the count of correctable errors reaching a pre-determined threshold, migrate data in the first region of memory to one of the n-1 additional regions of memory; and
    notify the on-board processing unit to use the one of the n-1 additional regions of memory instead of the first region of memory;
    initiate a change of power state of the on-board processing unit to cause the on-board processing unit to save the data in the first region of memory to local memory; and
    initiate a second active power state of the on-board processing unit, after the notifying the on-board processing unit of the one of the n-1 additional regions of memory to be used during runtime.

13. The medium as recited in claim 12, wherein at least one of the additional n-1 regions of memory is on a different physical memory unit than the first region.

14. The medium as recited in claim 12, further comprising instructions to:
  deactivate a physical memory unit on which the first memory region resides.

15. The medium as recited in claim 14, further comprising instructions to:
  flag the deactivated memory unit for replacement at a next maintenance cycle.

16. The medium as recited in claim 12, further comprising instructions to:
  copy data in the first region of memory to the one of the n-1 additional regions of memory, after suspending other system operations of both the host processor and on-board processing unit, before notifying the on-board processing unit to use the one of the n-1 additional regions of memory instead of the first region of memory.

17. The medium as recited in claim 12, wherein the reserving of the first and n-1 regions of memory further comprise instructions to:
  set system address decoder registers based on sizes of the reserved regions to enforce memory usage by a chipset associated with the platform, wherein the system address decoder registers and are accessible only at a system management level and are not accessible to the operating system or firmware.

18. A method, comprising:
  reserving a first region of a memory for use by an on-board processing unit on a platform;
  reserving n-1 additional regions of the memory, wherein the first region and the n-1 additional regions of the memory are invisible to and inaccessible by an operating system executing on the host processor on the platform;
  responsive to a memory error identified during runtime, maintaining a count of correctable and uncorrectable errors within the memory; responsive to the count of correctable errors reaching a pre-determined threshold, migrating data in the first region of memory to one of the n-1 additional regions of memory; and
  notifying the on-board processing unit to use the one of the n-1 additional regions of memory instead of the first region of memory;
  wherein the reserving of the first region and n-1 additional regions of memory further comprises:
  setting system address decoder registers based on sizes of the reserved regions to enforce memory usage by a chipset associated with the platform, wherein the system address decoder registers are accessible only at a system management level and are not accessible to an operating system or firmware.

19. The method as recited in claim 18, further comprising:
  initiating a change of power state of the on-board processing unit to cause the on-board processing unit to save the data in the first region of memory to local memory; and
  initiating a second active power state of the on-board processing unit, after the notifying the on-board processing unit of the one of the n-1 additional regions of memory to be used during runtime.

20. A computer readable storage medium having instructions stored thereon, the instructions when executed by a machine, cause the machine to:
  reserve a first region of a memory for use by an on-board processing unit on a platform;
  reserve n-1 additional regions of the memory, wherein the first region and the n-1 additional regions of the memory are invisible to and inaccessible by an operating system executing on the host processor on the platform;
  responsive to a memory error identified during runtime, maintain a count of correctable and uncorrectable errors within the memory;
  responsive to the count of correctable errors reaching a pre-determined threshold, migrate data in the first region of memory to one of the n-1 additional regions of memory; and
  notify the on-board processing unit to use the one of the n-1 additional regions of memory instead of the first region of memory;
  wherein the reserving of the first region and the n-1 additional regions of memory further comprise instructions to:
  set system address decoder registers based on sizes of the reserved regions to enforce memory usage by a chipset associated with the platform, wherein the system address decoder registers are accessible only at a system management level and are not accessible to an operating system or firmware.

21. The medium as recited in claim 20, further comprising instructions to:
  initiate a change of power state of the on-board processing unit to cause the on-board processing unit to save the data in the first region of memory to local memory; and
  initiate a second active power state of the on-board processing unit, after the notifying the on-board processing unit of the one of the n-1 additional regions of memory to be used during runtime.

* * * * *